United States Patent [19]

Symdra et al.

[11] Patent Number: 4,729,917

[45] Date of Patent: Mar. 8, 1988

[54] METHOD AND LAMINATE FOR THERMOFORMING AUTOMOBILE HEADLINERS AND LIKE THREE DIMENSIONAL OBJECTS

[75] Inventors: Andrew J. Symdra, Grand Rapids, Mich.; Harry J. Rozek, Athens, Ga.

[73] Assignee: Sackner Products Inc., Grand Rapids, Mich.

[21] Appl. No.: 922,697

[22] Filed: Oct. 24, 1986

[51] Int. Cl.[4] .................... B32B 3/00; B32B 31/00
[52] U.S. Cl. .................... 428/190; 156/212; 264/321; 428/285; 428/287; 428/309.9; 428/316.6
[58] Field of Search .................... 428/68, 71, 74, 76, 428/120, 189, 190, 284–287, 309.9, 316.6; 156/196, 212; 264/321

[56] References Cited

U.S. PATENT DOCUMENTS

| | | | |
|---|---|---|---|
| 2,642,920 | 6/1953 | Simon et al. | 428/251 |
| 2,768,026 | 10/1956 | Stephens et al. | 297/452 |
| 3,037,897 | 6/1962 | Pelley | 156/79 |
| 3,506,532 | 4/1970 | Bock et al. | 428/316.6 |
| 3,531,367 | 9/1970 | Karsten | 428/317.7 |
| 3,620,906 | 11/1971 | Hannes | 428/339 |
| 4,002,367 | 1/1977 | Thomas | 296/211 |
| 4,024,310 | 5/1977 | Wooler et al. | 428/247 |
| 4,256,797 | 3/1981 | Stamper et al. | 428/314.8 |
| 4,463,043 | 7/1984 | Reeves et al. | 428/68 |
| 4,489,126 | 12/1984 | Holtrop et al. | 428/246 |
| 4,529,641 | 7/1985 | Holtrop et al. | 428/198 |

FOREIGN PATENT DOCUMENTS 61-53257 11/1986 Japan .

*Primary Examiner*—William J. Van Balen
*Attorney, Agent, or Firm*—Price, Heneveld, Cooper, DeWitt & Litton

[57] ABSTRACT

The specification discloses a method for thermoforming three dimensionally contoured parts from a laminate comprising a stiff thermoformable polystyrene foam core to either side of which is laminated a porous, nonextendable rigidifying material and a fabric material. The porous, nonextendable rigidifying material is arranged so as to be subjected to two dimensional contouring but so as not to extend into areas of the laminate which will be subject to severe three dimensional contouring.

58 Claims, 2 Drawing Figures

METHOD AND LAMINATE FOR THERMOFORMING AUTOMOBILE HEADLINERS AND LIKE THREE DIMENSIONAL OBJECTS

BACKGROUND OF THE INVENTION

The present invention relates to thermoforming three dimensionally contoured articles such as automobile headliners. In the past, many automobile headliners have been formed by molding them of fiberglass reinforced polyester resin in a lay up molding process, as distinguished from thermoforming. VanDresser Inc. molds such a product of glass reinforced polyester resin, laminated to a rigid urethane foam and covered by a soft urethane backed fabric. Such headliners act as a sound board, thus making the interior of the vehicle more noisy. Further, the lay up molding process is costly.

Some have eliminated the boardiness of fiberglass resin headliners and the necessity of lay up molding by thermoforming a laminate comprised of a stiff structural yet thermoformable polystyrene foam and either kraft paper or a polymer film material bonded to either side of the foam. This laminate is covered with a soft polyurethane backed fabric. Thermoforming as opposed to lay up molding is cost effective. A laminate of a stiff polystyrene core with kraft paper or polymer film bonded to either side can be readily mass produced on automated equipment, cut into sheets, heated in a thermoforming operation and vacuum formed to shape. However, such headliners do not have sufficiently desirable sound absorbing properties because the kraft paper tends to reflect the sound rather than absorb it.

Many have endeavored to eliminate the paper or polymer film covering from such laminates and substitute a nonwoven fabric layer on one or both sides of the stiff polystyrene foam core in order to achieve better sound absorbing properties. One problem with such an approach is that automobile headliners must be able to withstand relatively high environmental use temperatures, i.e., 185 Degrees F. The structural foam polystyrene-fabric laminate tends to sag when exposed to such high temperatures.

The obvious solutions to the sagging problem include:
  (1) using a higher temperature foamed polymer; and/or
  (2) laminating nonwoven fabric to the polystyrene foam core which incorporates polymer binders having softening temperatures in the neighborhood of or above 185 Degrees F.

One drawback to using higher heat resistant polymer is that the foam core becomes increasingly difficult to thermoform into three dimensionally contoured configurations. Also, the material tends to be more rigid and less sound deadening than the stiff thermoformable polystyrene. The use of polymer binders in a nonwoven fabric which is laminated to the foam core having softening temperatures greater than 75 Degrees C. as suggested in U.S. Pat. No. 4,529,641 to Holtrop et al. does not seem to satisfactorily eliminate the sagging problem. The line of tolerance between using materials having excessive heat resistance, making thermoforming more difficult, and those having sufficient heat resistance to pass the environmental heating tests appears to be a difficult line to walk.

The '641 patent also suggests the possibility of using a thermoset phenolic resin as the nonwoven fabric binder. The theory of such use is to heat and thermoform the laminate before the thermosetting resin cures. Once it cures, forming is no longer possible. Having once set, the thermosetting phenolic binder would be resistant to any further deformation as a result of exposure to environmental temperatures of up to 185 Degrees F.

The problems with this theory are:
  (1) the thermosetting phenolic polymer may set during the heating step, and become nonformable when placed in the mold; and/or
  (2) the thermoset phenolic polymer component of the laminate may exhibit an undesirably short shelf life, i.e., set during storage, shipping and the like, thereby rendering the laminate non-thermoformable.

Those skilled in this art have spent years searching unsuccessfully for solutions to these problems. As a result, thermoformed kraft paper or polymer film and structural foam polystyrene laminates and lay up molded fiberglass reinforced polyester resin based laminates remain the principal automobile headliner constructions in use today.

SUMMARY OF THE INVENTION

In the thermoforming process of the present invention, three dimensionally contoured articles such as automobile headliners are thermoformed from a laminate of a stiff, thermoformable foam, a porous, nonextendable stiffening layer laminated thereto and a fabric layer laminated over the nonextendable layer, wherein the porous nonextendable layer is oriented to be subjected principally to two dimensional contour and does not extend into areas of the laminate which are subjected to substantial three dimensional contour formation. This makes it possible to mass produce a laminate for subsequent thermoforming which has excellent sound absorbing characteristics and which will pass environmental temperature requirements established by the automotive industry.

These and other objects, advantages and features of the present invention will be more fully understood and appreciated by reference to the written specification and appended drawings.

DESCRIPTION OF THE PREFERRED EMBODIMENT

Figure 1:
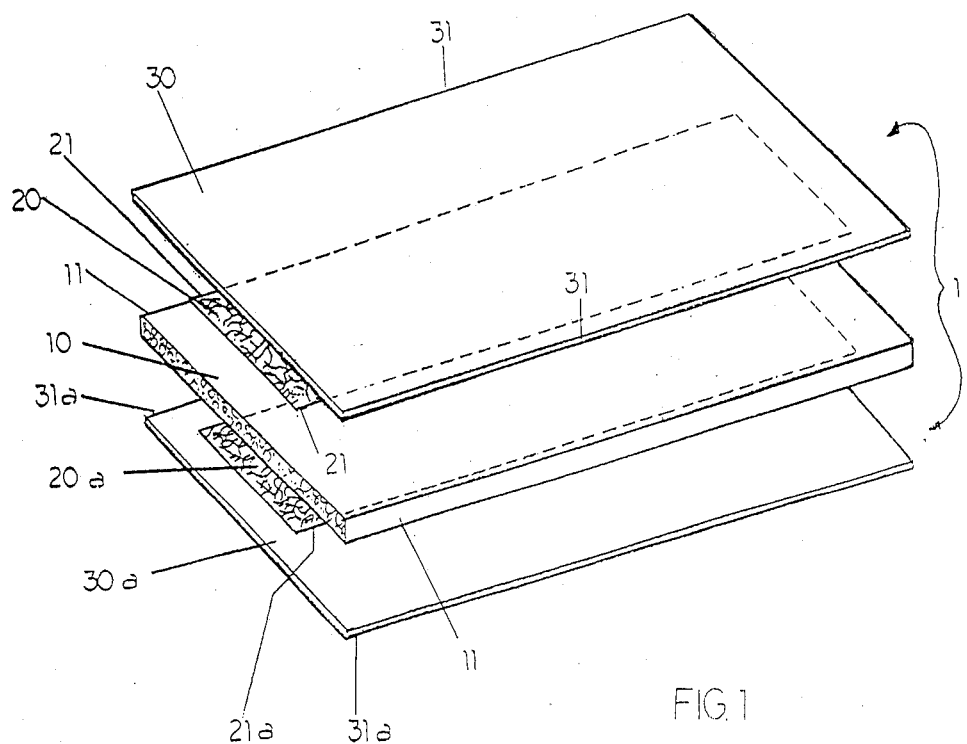
FIG. 1 is an exploded perspective view of the laminate of the present invention.

The laminate 1 of the present invention comprises a stiff foam core 10 to which is laminated a porous, nonextendable stiffening layer or mat 20 on one side and an identical porous, nonextendable stiffening layer or mat 20a on the other side. The edges 21 and 21a respectively of porous, nonextendable layers 20 and 20a are inset from the edges 11 of structural foam core 10. Laminated over porous, nonextendable layers 20 and 20a are fabric layers 30 and 30a respectively, the marginal edges 31 and 31a of which are aligned with and coextensive with the marginal edges 11 of structural foam core 10.

The nonextendable mats 20 and 20a are oriented in such a way that they do not extend into those areas of the laminate which will be subjected to severe three dimensional contours upon thermoforming. In the case of headliner 40 (FIG. 2) which is to be thermoformed from mat 1 (FIG. 1), the areas of most severe three dimensional contour are those areas in the vicinity of headliner side edges 41. Thus, edges 21 and 21a of nonextendable porous mats 20 and 20a are inset from the edges 11 of structural foam layer 10 and the edges 31 and 31a of fabric layers 30 and 30a. The specific distance of the inset will vary depending on the specific three dimensional configuration being thermoformed from laminate 1. Mats 20 and 20a are subjected to two dimensional contouring, but not severe three dimensional contouring.

Mats 20 and 20a must be "nonextendable" in the sense that they will not stretch when exposed to heat in the vicinity of 185 Degrees F., the critical environmental testing temperature for headliners. If mats 20 and 20a were extendable when exposed to such temperatures, headliner 40 would sag in the middle when exposed to heat.

It is also important that mats 20 and 20a be porous to a sufficient degree that they do not act as sound reflectors in the same sense as a sheet of kraft paper, a polymer film or a layer of solid fiberglass reinforced resin. The porosity of mats 20 and 20a allows sound to penetrate and be trapped behind mats 20 and 20a rather than bouncing off of them. While precise measures of porosity are difficult to specify and while there will be a good deal of latitude allowed to those skilled in the art, mats 20 and 20a are preferably sufficiently porous that one can gently blow air at them and feel it coming through the other side.

Mats 20 and 20a are preferably relatively thin. Thinness facilitates porosity and minimizes the potentially negative impact on sound properties represented by a nonextendable material.

The preferred way to obtain porosity is to use a mat comprising a plurality of fibers either thermobonded together or bonded together by just sufficient binder to bond them, but not sufficient binder to interfere with porosity. Both the fibers and the binder must be sufficiently heat resistant that they do not facilitate mat stretching at temperatures of 185 Degrees F. This makes a thermosetting binder most preferable.

We find that the fibers must be of a material which softens at a temperature in excess of 350 Degrees F., preferably in excess of 400 Degrees F. and most preferably in excess of 500 Degrees F. High melting point polyester fibers are acceptable, generally softening at temperatures between 400 Degrees F. and 500 Degrees F. Glass fibers are the most preferred, softening at temperatures far in excess of 500 Degrees F. Polymeric materials softening at temperatures lower than 350 Degrees F., such as polyolefins, are not operable in this invention. Excessive sag results even though the test temperature is only 185 Degrees F.

In the most preferred mode contemplated, mats 20 and 20a comprise a multitude of glass fibers bonded together by a thermosetting resin such as a urea formaldehyde polymer. The mats are preferably from about 10 to 20 mils thick The glass fibers are approximately 10 microns thick and approximately ½ inch long or more and have a specific gravity of about 2.5 to 2.7. This fabric weighs 2 ounces per square yard at a thickness of 12 mils. Its density is about 14 pounds/cubic feet, of which 80% is glass and 20% is binder. Thus the fiber density of the mat is about 11.25 pounds per cubic foot and the binder density is about 2.75 pounds per cubic foot. Just sufficient binder is used to hold the glass fibers together, so that the presence of binder does not unduly hinder porosity. Such a mat is available from Johns Mansville Corporation as "DURA-GLASS TM 7565."

An alternative mat material which may work in some circumstances, but which is not as effective as the above described porous fiberglass mat is a spun bonded polyester mat of comparable porosity and thickness. A high temperature polyester fiber must be employed. An example of such a material is 2.1 Bontex TM available from Van Waters and Rogers, Inc. of Kansas City, Kans. This material weighs 2.1 ounces per square yard at a thickness of about 12 mils, or about 15 pounds/cubic foot. The individual fiber density is about 1.38 grams/cubic centimeter. The fibers have a softening temperature in excess of 400 Degrees F. This material is somewhat less porous, given that the overall mat densities are comparable and the fiber density per se is less. Nevertheless, one can notice the passage of air through the mat when blowing air against it.

Stiff foam layer 10 comprises a foam polymeric material such as polyurethane or polystyrene. The most preferred material is a styrene-maleic anhydride copolymer sold by Arco Chemical Company under the trademark "DYLARK TM " 232. This material has a softening temperature of about 200 Degrees F. and can be readily thermoformed at temperatures of approximately 250 Degrees F. It is a stiff material, but is not so rigid as to act as a sound board. It has sufficient internal flexibility or compressibility to act as a sound deadener. While such a material will not in and of itself resist sagging under environmental testing at 185 Degrees F., it will when incorporated into laminate 1 of the present invention.

Foam core 10 can be a single layer or can itself be a laminate of two separate foam layers adhered together. We prefer that foam core 10 have a thickness of approximately 0.14 to 0.18 inches to begin with, either singly or as a composite of two foamed layers, and be of a foam which, upon application of heat, can be expanded further. Foam core 10 should be capable of undergoing about a 300% expansion when exposed to heat in thermoforming to a final thickness in headliner 40 of approximately one-half inch. This concept is in accordance with the invention and teaching of Mr. Leonard W. Robinson, and is the subject of co-pending U.S. patent application Ser. No. 598,655 now U.S. Pat. No. 4,695,501, exclusively licensed to the assignee of our invention. It has a density of from 3.5 to 5.5 initially, and from about 1.2 to about 1.8 when expanded.

The fabric layers 30 and 30a serve as sound absorbing or sound deadening layers. A preferable fabric material is a nonwoven fabric. We prefer the use of a blend of 50% six denier and 50% fifteen denier polyester fibers with a relatively high melting point of 440 to 450 Degrees F. and a softening temperature of 420 Degrees F. These fibers are approximately two inches in length and are bonded together by a polyvinyl chloride-styrene-acrylic terpolymer in which polyvinyl chloride is the predominant component. This is commonly used as a nonwoven fabric binder. The styrene and acrylic contents are around 10% each. This binder does cross link and hence becomes more resistant to heat degradation after thermoforming. The ratio of binder to fiber is 50/50 by weight. The binder itself includes approximately 50% by weight aluminum trihydrate to render nonwoven fabric layers 30 and 30a fire retardant. Fabric layers 30 and 30a are approximately 3/32 of an inch thick prior to being pressed in the lamination process, after which they have a thickness of approximately 1/16 of an inch.

The adhesives used to bond the laminated layers together must of course be suitable for the materials being bonded, must be moisture resistant and must have softening ranges lower than the melting point of the polystyrene-maleic anhydride copolymer foam core 10 but higher than the environmental exposure temperature of 185 Degrees F. By having a softening temperature range lower than the degradation temperature of the foam core 10, the polymer adhesive layers will not interfere with the thermoforming of laminate 1. Yet, the polymer adhesive layers will not soften and allow delamination at the 185 Degree F. environmental exposure test temperature. Thus, the polymers used as adhesives must soften within the range of 185 to 255 Degrees F., preferably around 225 to 255 Degrees F.

We prefer the use of a polyamide adhesive web material for bonding the porous, fiberglass mats 20 and 20a to foam core 10. This material softens within the range of 235 to 255 Degrees F. A preferred material is Sharnet ™ SH240 adhesive web, available from Sharnet Corporation. The adhesive web is placed between polystyrene foam core 10 and porous fiberglass layers 20 and 20a and is heated in a heating press when the various laminate layers are pressed together.

We prefer to adhere the nonwoven fabric layers 30 and 30a to fiberglass layers 20 and 20a, and at their edges to foam core 10, by means of an ethylene vinyl acetate adhesive having a softening range of 230 to 250 Degrees F. Such a material is sold by Hughes Division of PPG under the trade designation HC6990.

Figure 2:
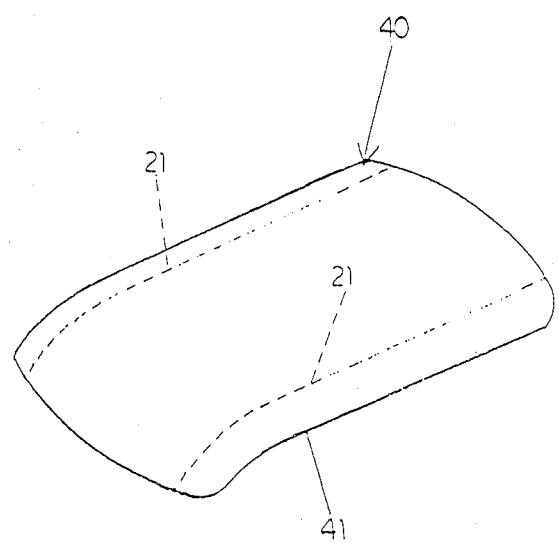
FIG. 2 is a perspective view of an automobile headliner thermoformed from the laminate of FIG. 1.

Laminate 1 is formed by pressing the various layers of material and polymer adhesives at a temperature of from about 240 to about 250 Degrees F., under a pressure of from about 40 to about 60 pounds per square inch. The thus formed laminate can then be shipped to a headliner manufacturer where it is thermoformed into a desired three dimensional configuration, e.g., headliner 40 (FIG. 2). In the thermoforming process, laminate 1 is first heated under heating elements to a temperature of about 245 Degrees F., and is then placed in a cooled compression forming mold assembly having the desired configuration.

Being nonextendable, layers 20 and 20a must slide somewhat relative to their adjacent foam core 10 and fabric layers 30 and 30a. This is facilitated by the intermediate adhesives used. Nonextendable porous layers 20 and 20a do not extend into the edge areas of laminate 1 so that the more sharply three dimensionally contoured sides of headliner 40 can be formed. The presence of a nonextendable material extending all of the way to the edges of laminate 1 would prevent the formation of headliner 40 in the configuration shown in FIG. 2.

Of course, it is understood that the above is merely a preferred embodiment of the invention and that various changes and alterations can be made without departing from the spirit and broader aspects thereof.

The embodiments of the invention in which an exclusive property or privilege is claimed are defined as follows:

1. A method for forming three dimensionally contoured parts such as automobile headliners comprising:
thermoforming a laminate of a relatively stiff, thermoformable foam core, a porous, nonextendable material laminated thereto and a fabric laminated to and covering said porous, nonextendable layer, wherein said porous, nonextendable layer is arranged so as to be subject to two dimensional contouring in said thermoforming process, is arranged so as not to extend into areas of the laminate which will be subject to severe three dimensional contour formation, and is sufficiently porous to have better sound absorbing properties than a polymeric film material or a material such as kraft paper.

2. The method of claim 1 in which said fabric layer comprises a nonwoven fabric.

3. The method of claim 2 in which another porous, nonextendable layer and another fabric layer are similarly arranged on the opposite side of said foam core.

4. The method of claim 3 in which said porous nonextendable layer comprises a mat of bonded fibers, said fibers being of a material having a softening temperature in excess of 350 Degrees F.

5. The method of claim 4 in which said fiber softening temperature is in excess of 400 Degrees F.

6. The method of claim 5 in which said fiber softening temperature is in excess of 500 Degrees F.

7. The method of claim 3 in which said porous, nonextendable layer comprises a thin, porous, fiberglass mat.

8. The method of claim 7 in which said fiberglass mat is from about 10 to about 20 mils thick and incorporates just sufficient binder to hold the glass fibers together, whereby said binder only minimally interferes with the porosity of said mat.

9. The method of claim 8 in which said nonextendable layer includes lateral edges which are inset from the lateral edges of said foam core and said fabric layer, said thermoforming being conducted such that said laminate has its greatest three dimensional contour in the area adjacent its lateral edges, beyond said lateral edges of said nonextendable mat.

10. The method of claim 9 in which said foam core comprises a polystyrene-maleic anhydride copolymer foam having a density of from about 3.5 to about 5.5 pounds per cubic foot.

11. The method of claim 10 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

12. The method of claim 3 in which said porous nonextendable layer comprises a thin, porous polyester fiber mat, said fibers having a softening temperature in excess of 400 Degrees F.

13. The method of claim 12 in which said polyester fiber mat is a spun bonded polyester fiber mat from about 10 to about 20 mils thick.

14. The method of claim 13 in which said nonextendable layer includes lateral edges which are inset from the lateral edges of said foam core and said fabric layer, said thermoforming being conducted such that said laminate has its greatest three dimensional contour in the area adjacent its lateral edges, beyond said lateral edges of said nonextendable mat.

15. The method of claim 14 in which said foam core comprises a polystyrene-maleic anhydride copolymer foam having a density of from about 3.5 to about 5.5 pounds per cubic foot.

16. The method of claim 15 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

17. The method of claim 1 in which said porous, nonextendable material comprises a thin, porous, fiberglass mat.

18. The method of claim 17 in which said fiberglass mat is from about 10 to about 20 mils thick and incorporates just sufficient binder to hold the glass fibers together, whereby said binder only minimally interferes with the porosity of said mat.

19. The method of claim 18 in which said nonextendable layer includes lateral edges which are inset from the lateral edges of said foam core and said fabric layer, said thermoforming being conducted such that said laminate has its greatest three dimensional contour in the area adjacent its lateral edges, beyond said lateral edges of said nonextendable mat.

20. The method of claim 1 in which said porous nonextendable layer comprises a thin, porous polyester fiber mat, said fibers having a softening temperature in excess of 400 Degrees F.

21. The method of claim 20 in which said polyester fiber mat is a spun bonded polyester fiber mat from about 10 to about 20 mils thick.

22. The method of claim 21 in which said nonextendable layer includes lateral edges which are inset from the lateral edges of said foam core and said fabric layer, said thermoforming being conducted such that said laminate has its greatest three dimensional contour in the area adjacent its lateral edges, beyond said lateral edges of said nonextendable mat.

23. The method of claim 22 in which said foam core comprises a polystyrene-maleic anhydride copolymer foam having a density of from about 3.5 to about 5.5 pounds per cubic foot.

24. The method of claim 23 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

25. The method of claim 1 in which said foam core comprises a polystyrene-maleic anhydride copolymer foam having a density of from about 3.5 to about 5.5 pounds per cubic foot.

26. The method of claim 25 in which another porous, nonextendable layer and another fabric layer are similarly arranged on the opposite side of said foam core.

27. The method of claim 26 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

28. The method of claim 1 in which said nonextendable layer includes lateral edges which are inset from the lateral edges of said foam core and said fabric layer, said thermoforming being conducted such that said laminate has its greatest three dimensional contour in the area adjacent its lateral edges, beyond said lateral edges of said nonextendable mat.

29. The method of claim 28 in which another porous, nonextendable layer and another fabric layer are similarly arranged on the opposite side of said foam core.

30. A thermoformable laminate comprising:
a relatively stiff, thermoformable foam core, a porous, nonextendable material laminated thereto and a fabric laminated to and covering said porous, nonextendable layer, wherein said porous, nonextendable layer is arranged so as to be subject to two dimensional contouring in a thermoforming process, and is arranged so as not to extend into areas of the laminate which will be subject to severe three dimensional contour formation, and is sufficiently porous to have better sound absorbing properties than a polymeric film material or a material such as kraft paper.

31. The article of claim 30 in which said fabric layer comprises a nonwoven fabric.

32. The article of claim 31 in which another porous, nonextendable layer and another fabric layer are similarly arranged on the opposite side of said foam core.

33. The article of claim 32 in which said porous nonextendable layer comprises a mat of bonded fibers, said fibers being of a material having a softening temperature in excess of 350 Degrees F.

34. The article of claim 33 in which said fiber softening temperature is in excess of 400 Degrees F.

35. The article of claim 34 in which said fiber softening temperature is in excess of 500 Degrees F.

36. The article of claim 32 in which said porous, nonextendable material comprises a thin, porous, fiberglass mat.

37. The article of claim 36 in which said fiberglass mat is from about 10 to about 20 mils thick and incorporates just sufficient binder to hold the glass fibers together, whereby said binder only minimally interferes with the porosity of said mat.

38. The article of claim 37 in which said nonextendable layer includes lateral edges which are inset from the lateral edges of said foam core and said fabric layer.

39. The article of claim 38 in which said foam core comprises a polystyrene-maleic anhydride copolymer foam having a density of from about 3.5 to about 5.5 pounds per cubic foot.

40. The article of claim 39 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

41. The article of claim 32 in which said porous nonextendable layer comprises a thin, porous polyester fiber mat, said fibers having a softening temperature in excess of 400 Degrees F.

42. The article of claim 41 in which said polyester fiber mat is a spun bonded polyester fiber mat from about 10 to about 20 mils thick.

43. The article of claim 42 in which said nonextendable layer includes lateral edges which are inset from the lateral edges of said foam core and said fabric layer.

44. The article of claim 43 in which said foam core comprises a polystyrene-maleic anhydride copolymer foam having a density of from about 3.5 to about 5.5 pounds per cubic foot.

45. The article of claim 44 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

46. The article of claim 30 in which said porous, nonextendable material comprises a thin, porous, fiberglass mat.

47. The article of claim 46 in which said fiberglass mat is from about 10 to about 20 mils thick and incorporates just sufficient binder to hold the glass fibers together, whereby said binder only minimally interferes with the porosity of said mat.

48. The article of claim 47 in which said nonextendable layer includes lateral edges which are inset from the lateral edges of said foam core and said fabric layer.

49. The article of claim 30 in which said porous nonextendable layer comprises a thin, porous polyester fiber mat, said fibers having a softening temperature in excess of 400 Degrees F.

50. The article of claim 49 in which said polyester fiber mat is a spun bonded polyester fiber mat from about 10 to about 20 mils thick.

51. The article of claim 50 in which said nonextendable layer includes lateral edges which are inset from the lateral edges of said foam core and said fabric layer.

52. The article of claim 51 in which said foam core comprises a polystyrene-maleic anhydride copolymer foam having a density of from about 3.5 to about 5.5 pounds per cubic foot.

53. The article of claim 52 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

54. The article of claim 30 in which said foam core comprises a polystyrene-maleic anhydride copolymer foam having a density of from about 3.5 to about 5.5 pounds per cubic foot.

55. The article of claim 54 in which another porous, nonextendable layer and another fabric layer are similarly arranged on the opposite side of said foam core.

56. The article of claim 55 in which said nonwoven fabric comprises approximately 50% six denier fibers and 50% fifteen denier fibers of approximately two inches in length, bound together by a polymer binder in a binder to fiber ratio of 50/50 and having a thickness of from about one-sixteenth to about one-eighth of an inch.

57. The article of claim 30 in which said nonextendable layer includes lateral edges which are inset from the lateral edges of said foam core and said fabric layer.

58. The article of claim 57 in which another porous, nonextendable layer and another fabric layer are similarly arranged on the opposite side of said foam core.

* * * * *